Aug. 2, 1966  W. L. CARLSON, JR  3,264,547
CONDUCTIVE FLUID ELECTRIC POWER CONVERSION MEANS
Filed March 25, 1963  2 Sheets-Sheet 1
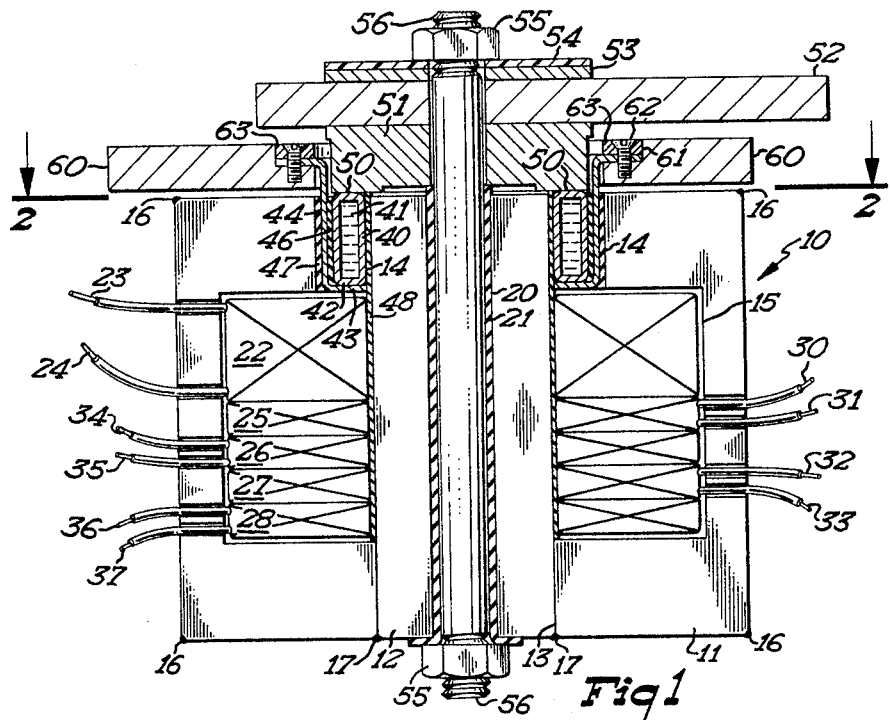
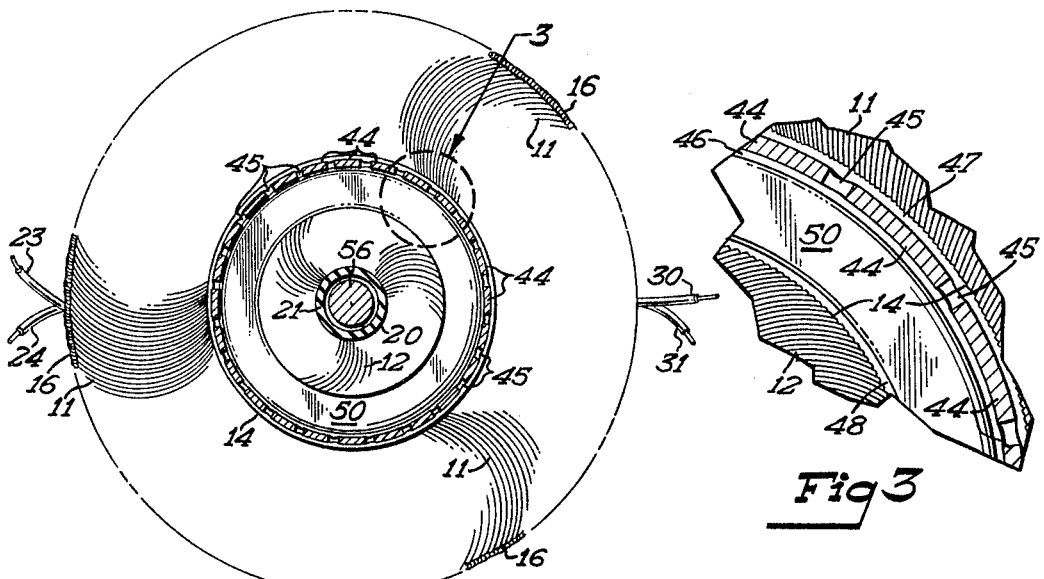
INVENTOR.
WILLIAM L. CARLSON, JR.
BY Alfred N. Feldman
ATTORNEY Aug. 2, 1966 W. L. CARLSON, JR 3,264,547
CONDUCTIVE FLUID ELECTRIC POWER CONVERSION MEANS
Filed March 25, 1963 2 Sheets-Sheet 2

INVENTOR.
WILLIAM L. CARLSON, JR.
BY Alfred N. Feldman
ATTORNEY

United States Patent Office 3,264,547
Patented August 2, 1966

3,264,547
CONDUCTIVE FLUID ELECTRIC POWER CONVERSION MEANS
William L. Carlson, Jr., Bloomington, Minn., assignor to Honeywell Inc., a corporation of Delaware
Filed Mar. 25, 1963, Ser. No. 267,593
10 Claims. (Cl. 321—8)

The present invention is primarily directed to a conductive fluid power conversion means that is capable of converting an exceedingly low voltage, direct current to a more usable level of either direct current or alternating current. This invention is an improvement on my Conductive Fluid Power Transformer which is disclosed in Patent No. 3,034,002, which issued May 8, 1962.

Considerable work has been done in the field of power generation or conversion with conductive fluids, such as the liquid metal known as NaK. NaK is a mixture of sodium and potassium and is one of the more common conductive fluids utilized in present day conductive fluid units. The invention, however, is in no way limited to the use of liquid metal, but may be any type of conductive fluid. The use of electromagnetic flowmeters is one way of converting power and such meters have been built which develop voltage that is allowed to be dissipated by the return path surrounding the flowmeter walls and in the fluid itself. In some of the more sophisticated designs, the generated voltage is bucked out and the bucking voltage read as a measure of the flow rate. This type of power convertor has a very limited capacity and is not generally applicable to the problem of converting large currents at low voltage to any more usable form.

Conductive fluid pumps discharging into a generating gap of the flowmeter type and returning to the pump have been investigated. A disclosure of this type is incorporated in the above-referenced issued patent. This work has been done by a number of people both in the United States and abroad. The energy level changes and the devices previously considered appear to be quite limited and the over-all transfer of work is low enough to result in poor efficiency. One of the main efficiency limiting factors under certain conditions of load is the entrance and exit eddy current losses. These losses occur even on direct current equipment when the conductive fluid enters or exits from the fields in which the gaps of the device are located. In the pump-generator arrangement, this occurs four times, once each at each end of the gap. This eddy current loss is actually evident whenever the fluid being circulated experiences a change in flux density with respect to time. This more fundamental limitation imposes the restriction that the fluid velocity and/or the flux density must be such as to maintain a constant rate of change of flux with respect to time and preferably this must be equal to zero. Since energy levels can change only when a change occurs from a variation in velocity, flux density, or length of conductor, most of the simple devices previously utilized in this field of endeavor have the combination of eddy current losses that have been described above.

A second major consideration is that of the pumping effect when a generator is connected in a hydraulic loop to a pump. This means that the actual energy conversion is from electrical to hydraulic, and then back again to electrical. Previous work has indicated that the pumping action is less efficient than its generating counterpart, and without careful design, the hydraulic losses in this type of a loop can be excessive.

A third consideration of a conductive fluid armature device that bears a direct influence on the configuration is the interaction of the armature circuit current and the field excitation flux. Work on conductive fluid pumps and flowmeters has resulted in the solution to this problem by several means. Regardless of the particular solution utilized, it is normally referred to as "compensation," and it has become apparent that any configuration of a conductive fluid power converting device must be totally compensated in order to obtain a sufficient efficiency to make a device of this type commercially and economically feasible.

In order to meet the requirements for the most efficient possible power conversion system, the considerations stated above seem to indicate that the device should have the following characteristics. The fluid as it flowed should experience no change or little change in flux density through its entire cycle. The fluid flow should be at the lowest possible velocity commensurate with the required conversion requirements of the device. The total distance that the fluid travels must be kept to a minimum. The confining passage must be shaped so as to impose a minimum of hydraulic loss on the unit. The fluid flow passage should be constructed so that there is a minimum of shunting of electric current in the device through the side walls of the unit. With these considerations in mind, the invention of the present disclosure was developed.

The primary object of the present invention is to disclose a power conversion means utilizing a conductive fluid as the converting medium in which a minimum of loss is provided by having the shortest possible hydraulic route commensurate with the output requirements and one which entails little or no change in magnetic flux through the entire circuit.

A further object of the present invention is to disclose a conductive fluid electric power conversion means that is capable of converting an exceedingly low voltage at a high current into a mere usable form of electrical energy.

Yet another object of the present invention is to disclose a power conversion device which is capable of converting direct current to alternating current, and which utilizes a very minimum amount of alternating current as an operating input.

Another object of the present device is to disclose a conductive fluid power converting device that is capable of converting a direct current potential of an exceedingly low value to a higher level of direct current potential in an efficient way.

Still another object of the present invention is to disclose a power conversion means that is normally energized from a low voltage, high current direct current source and which is capable of isolating the voltage or power to be converted from the output power so as to provide a usable converted electrical energy.

These and other objects will become apparent when the present device is considered along with the drawings, wherein:

FIGURE 1 is a cross section of a conductive fluid power conversion means utilizing a single annular conductive fluid channel and having a laminated magnetic structure so that the device can be used to convert direct current to alternating current;

FIGURE 2 is a section of FIGURE 1 taken along line 2—2;

FIGURE 3 is an enlarged portion of FIGURE 2 as indicated by the reference circle in FIGURE 2;

FIGURES 9, 10, and 11 are three schematic representations of a conductive fluid electric power conversion systems utilizing direct current to alternating current power conversion means of the type disclosed in FIGURES 1–6.

Figure 10:
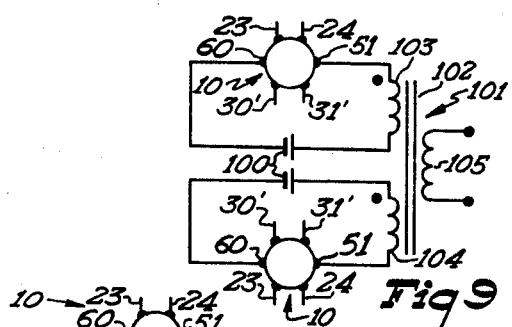

The conductive fluid electric power conversion means that is shown in detail in FIGURES 1–3, has been operationally tested in a push-pull configuration similar to that disclosed in FIGURE 10. Some of the constructional details have been simplified for the present explanation of the design and function of the novel device, and a number of various and other configurations of the device have been disclosed.

Since this device can be constructed in many configurations and still be within the scope of the present invention, the specific unit disclosed in FIGURES 1–3 should be considered as only representative. The device is particularly adapted for converting exceedingly low potential direct current into more usable levels. Devices such as fuel cells, thermo-electric generators, and solar cells develop an exceedingly low potential that is very difficult to utilize. These devices require some conversion system to make the voltage available more readily adaptable for powering more conventional units. The device disclosed by the present invention has been tested at levels as high as 1,900 amperes at 0.08 volts direct current input with a nominal direct current applied to the magnetic field coils for production of the magnetic field necessary for its operation. The device also utilizes a nominal alternating current that would be available from ordinary commercial sources and which provides part of the generated magnetic flux necessary to provide the conversion from direct current to alternating current. With this background, a full disclosure of the structure and operation of FIGURES 1–11 is made.

In FIGURE 1, there is disclosed in cross section a single conductive fluid power conversion means 10. The conversion means 10 is made up of two groups of laminated magnetic members 11 and 12. The laminated members 11 are C-shaped in cross section and are bent to form a curved surface. This can be readily seen in FIGURES 2 and 3. The laminations 12 are a plurality of rectangular members that are curved so that they can be stacked together to form an annular magnetic member. When a plurality of the laminations 11 are fitted together, they form a completely circular laminated structure having an air gap 13 and an air gap at 14 with an enlarged recess 15. The laminations are assembled in a jig or form and then are welded at 16 around the outer periphery to lock the laminations into a unitary magnetic member.

A plurality of the laminations 12 are assembled to form an annular magnetic core for the device and are placed in the air gap 13 and welded at 17 to lock the laminations 12 to the laminations 11 to form the entire magnetic circuit means for the device. With this arrangement, the magnetic circuit means has the remaining air gap 14 that will be described in some detail along with the equipment that is placed in the air gap 14.

A central hole 20 is left in the laminations 12 by the fashion in which they are assembled and the hole 20 is lined with an insulating member 21. The insulating member 21 has been shown in an enlarged and exaggerated cross section. In reality, the insulating member 21 is a coat of varnish. At the exceedingly low voltages involved in the present device, certain of the insulating surfaces that have been shown in exaggerated form as insulating members are in fact coats of varnish. It is well known that electrical varnish will withstand the nominal voltages involved in these areas of the present device.

During the assembly of the magnetic circuit, as previously described, an electric coil 22 having leads 23 and 24 is placed within recess 15 of the device. A further group of coils 25, 26, 27, and 28 are also placed in the recess 15 and the conductors from coils 25–28 have been indicated by the numbers 30–37. Each of the conductors 23, 24, and 30–37 are brought out through holes drilled through the laminated structure. In the device actually constructed and tested, all of the holes were drilled in approximately the same line and all of the conductors were brought out to an appropriate terminal board, not disclosed.

The coils 25–28 were utilized for convenience and all of the coils 25–28 could be replaced by a single coil having but a pair of terminals, similar to the coil 22. In the presently disclosed device, the coil 22 is connected by conductors 23 and 24 to a source of alternating current at 60 cycles (not shown), and the coils 25–28 were energized by their conductors 30–37 from a single source of direct current (not shown). With both of the coils 22 and a group of coils 25–28 energized in this fashion, a magnetic flux was generated in the structure 10 and this flux was made up of a first component which is constant due to the direct current energization of the coils 25–28, while the second component was of an alternating nature due to the energization of coil 22 by alternating current. The effect of this energization of the coils 22 and 25–28 was to generate a magnetic flux radially across the air gap 14. This flux can be considered as being of a fixed value which has alternations above and below the fixed or reference value. In any regard, this magnetic flux can be considered as separable into two distinct components, dependent on the mode of creating the flux.

Inserted in air gap 14 is an annular conduit 40 that is filled with a conductive fluid 41. In this particular case, the fluid was of the type known as NaK, previously discussed. The conductive fluid substantially fills the conduit and the conduit is a closed annular unit. Attached to the bottom 42 of the conduit 40 is a conductor or electrode means 43. In reality, the conductor 43 is a sheet of copper that has been bent into a Z-shape and which has individual segments 44 separated by air spaces 45 (FIGURE 2). The separation of the conductor 43 into segments is to prevent eddy current flow in an annular fashion through the device and substantially limits any current flowing in the electrode means 43 to a straight line along the Z-shaped cross section of the segment 44. Insulating layers 46 and 47 isolate electrode 45 from the air gap 14 and the conduit 40.

Attached to the top 50 of the conduit 40 by any convenient welding or soldering technique is an electrode 51. The electrode 51 is an annular or washer-like copper member that is in contact with the top 50 of the conduit means 40, but which is raised from the top of the laminations 12 so as to provide electrical insulation. Attached to electrode 51 as a further copper electrode 52 that is used for connection of one side of the device to a high current, low voltage source, and as an output electrode, as will be seen below. These copper members form an electrode means generally for the device.

A washer 53, an insulating washer 54, and nuts 55 along with bolt 56 clamp the device into a unitary structure. The nuts 55 and bolt 56 hold the electrodes 51 and 52 in place which, in turn, supports the conductive fluid conduit 40 in the air gap 14. To complete the electrical circuit necessary for the device disclosed in FIGURE 1, a ring-like electrode 60 is provided around the electrode 51. An air space allows the conductor segments 44 to be brought up to a recess 61 in the electrode 60 where screws 62 clamp a ring of conductive metal 63 over the conductor segments 44. The ring 63 is used as a clamping means to make good electrical contact between the conductor 43 in the form of the segmented members 44 and the electrode 60. In addition to the screws utilized for clamping, the device can be soldered or welded to complete the electrical joint.

In considering the structure to this point, it should be noted that an electrical path is provided between the electrode 52 and the electrode 51 where an electrical connection is made at surface 50 to the conduit 40. The conduit 40 is made of a high resistance metal but allows good conductivity of the electricity from electrode 51 across the thin surface 50 into the conductive fluid 41. Since the conduit 40 has thin walls, the long or vertical sections of the wall form a high resistance path to electrical flow as compared to the conductive fluid 41, and the bulk of the current flows through the conductive fluid 41 to the lower side 42 of the conduit 40. At 42, the conductor 43 is connected to conduit 40 thereby completing an electrical path for current flow from the electrode 52. The current is then brought out on the conductor segment members 44 to the electrode 60. It is thus obvious that any current flowing from electrode 52 passes into the magnetic structure in the gap 14 through the expedient of the conductive fluid 41 and then passes back out through that same gap by the expedient of the conductor 43 and the segments 44. This arrangement is to provide a full compensation of the magnetic effects created by the current flow through the conductive fluid. This expedient is well known in the art and is one of the many possible means of compensating a conductive fluid device.

As previously described, the magnetic structure has both an alternating current coil and direct current coil means to provide a generated magnetic flux. When a high current flows between electrode 52 and electrode 60 of a direct current nature, the direct current passing through the conductive fluid 41 reacts with the continuous or direct magnetic flux component to create a conductive fluid pump. This conductive fluid pump then circulates the conductive fluid 41 endlessly around the annular conduit 40. This spinning fluid has a peculiar characteristic. This fluid never leaves the magnetic flux field to which it is subjected. Further, the construction is the shortest possible route, being a circle around an annular or circular device. These requirements meet two of the essential requirements of a conductive fluid electric power conversion means that has an efficient output.

If the conductive fluid 41 is considered as spinning, due to the influence of the mutually right-angled electric current from the direct current source to be converted and the constant magnetic field from the direct current energized coil, it should be noted that the spinning conductive fluid 41 is also being cut by an alternating magnetic field established by the coil 22 which has been connected to an alternating current source. As such, the spinning conductive fluid 41 is cut by an alternating magnetic field and thereby generates an alternating electric current. This alternating electric current is different in form from the current to be converted and is available between the electrode 52 and the electrode 60. If some means is provided for filtering this combination of direct current and alternating current available on the electrodes 52 and 60, it is possible to convert from a high current, low potential direct current into an alternating current form. The means of obtaining this isolation is discussed subsequently in the present specification.

The theory of operation of the device disclosed in FIGURES 1–3 can possibly be better understood if an analogy is drawn between the device disclosed in FIGURES 1–3 and simple vacuum tube triode amplifier. In a simple vacuum tube triode amplifier, a fixed potential is applied by a bias device between the control grid and the cathode. The control grid is then supplied with some form of alternating current signal. This alternating current signal turns the triode on and off and allows current flow to pass between the cathode and plate of the amplifier. The voltage between the cathode and the plate is normally supplied by some fixed voltage source and the current flow is normally through some type of load device, such as a resistor. If the signal supplied to the grid of the amplifier is of an alternating form, the flow of current through the load resistance is also of the same form but is magnified or amplified in its voltage level. The present device operates in somewhat the same fashion by using the two components of magnetic flux and the single magnetic circuit. One flux is used as a main generating flux, while the second flux is used as a signal flux to be amplified in the device. The output is then taken off through a load device which, in turn, has two components available to it, one being a fixed component supplied by the main power supply, while the other component across the load is an amplified version of the input signal. If the presently disclosed device is considered as an amplifier in the same sense that the triode amplifier of the vacuum tube type is considered, some understanding of the amplification of the current to be converted can be appreciated.

Figure 4:
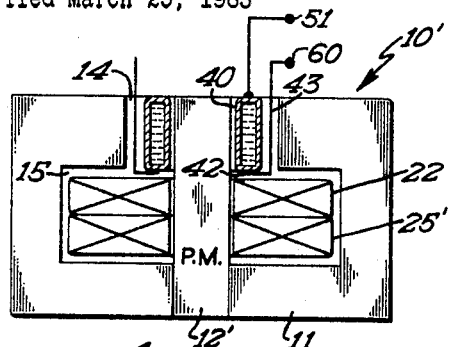
FIGURE 4 is a schematic representation of FIGURE 1 incorporating the addition of a permanent magnet to the magnetic circuit.

The principle developed in connection with FIGURES 1–3 can be applied to many physical configurations. In order to clarify a number of these possible configurations, the device has been shown in schematic form in FIGURES 4–8 with variations that can be readily accomplished within the scope of the present invention. In FIGURE 4, a schematic representation of the device disclosed in FIGURES 1–3 is provided, with slight modification. Similar numbering will be used so that a correspondence will be apparent. In FIGURE 4, a conductive fluid power conversion means 10′ is provided having laminates 11 in the outer structure, and a center leg 12′ which is in this case a permanent magnet. The permanent magnet of course could be replaced by laminations of the type disclosed in FIGURE 1 if an identical configuration to FIGURE 1 is desired. Provided within an air gap 14 is a coil 22 and a coil 25′ which corresponds to the coils 25–28 of FIGURE 1. A conductive fluid filled channel 40 is provided in the annular air gap 14 and is connected to electrodes 51 and 60. Electrode 60 again has a proper conductive means 43, which connects the electrode 60 to the bottom 42 of the conductive fluid filled channel 40.

The device disclosed in FIGURE 4 operates in an identical fashion to that disclosed in FIGURE 1, except that a permanent magnet is supplied to supplement the permanent magnetic flux generated by the coil 25′. In some cases the coil 25′ might be left out of the device entirely and the permanent magnet 12′ utilized as the sole flux component of a constant nature which is used to generate the circulating motion in the conductive fluid filled channel 40.

Figure 5:
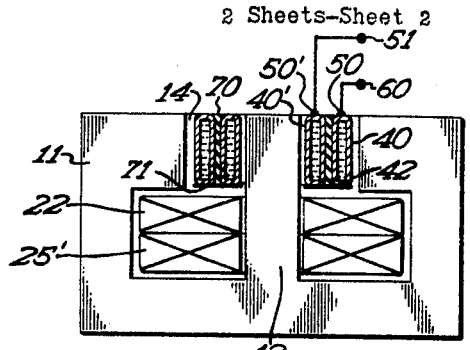
FIGURE 5 is a schematic representation of a device similar to that of FIGURE 1, but utilizing two concentric fluid conduits.

In FIGURE 5, the disclosed conductive fluid electric power conversion means has laminates 11 in the magnetic structure with center laminations 12 and coils 22 and 25′. Again the air gap 14 is provided along with the electrodes 51 and 60 which, in this case, are connected to two concentric conductive fluid filled conduits 40 and 40′. The conduits 40 and 40′ are concentric with one another and are separated by an insulating member 70, again an insulating varnish. The conduits 40 and 40′ are connected at their bottom edges by an electrical connection means 71 so that electrical current flowing from electrode 51 passes into the top 50′ of the conduit 40′ and passes to the electrical connection means 71. The electrical connection means then connects the current flow to the bottom 42 of the conduit 40, where the current passes back through the conductive fluid in conduit 40 to the top 50 of the conduit to in turn flow to the electrode 60. The difference between the device disclosed in FIGURE 5 and that in FIGURE 1 is that the conductor 43 which returns the current adjacent the conduit 40 has been replaced by a second concentric conduit 40′. This provides for the full compensation of the magnetic fields generated by the current flow between electrodes 51 and 60 as they pass into and out of the air gap 14. With this arrangement, two concentric fluid filled conduits provide rotating fluid which in turn is cutting the magnetic field generated by the alternating current flux that has been set up from the coil 22. Again, this provides for the conversion and differs from FIGURE 1 only in that the compensation means has been replaced by a conductive fluid filled channel rather than the mere copper conductors.

Figure 6:
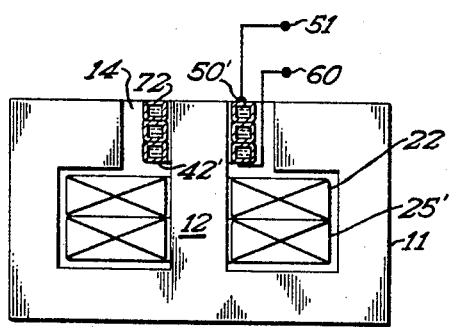
FIGURE 6 is a schematic representation of a power conversion means utilizing a spiral or helical fluid conduit means.

In FIGURE 6, there is disclosed a conductive fluid electric power conversion means in which the laminations 11 and 12 provide the air gap 14 which has placed within it a closed spiral conduit 72 having three turns. The spiral conduit 72 again has electrodes 51 and 60 connected respectively to the top 50' and bottom 42' so that the electric current applied between the electrodes 51 and 60 passes through the convolutions of the spiral conduit 72. Coils 22 and 25' are again provided to generate the necessary components of the magnetic flux across the air gap 14. The spiral conductive fluid filled conduit 72 is closed back on itself to form an endless helical path for the conductive fluid to circulate within. Since the conductive fluid path in this arrangement is substantially longer than the previously utilized paths, the voltage transformation ratio of the device is changed. This change in length of the conduit 72 alters the hydraulic losses of the device, but subjects the flowing fluid to a different fraction of the generated magnetic flux on each turn, thereby accomplishing a change in transformation ratio.

Figure 7:
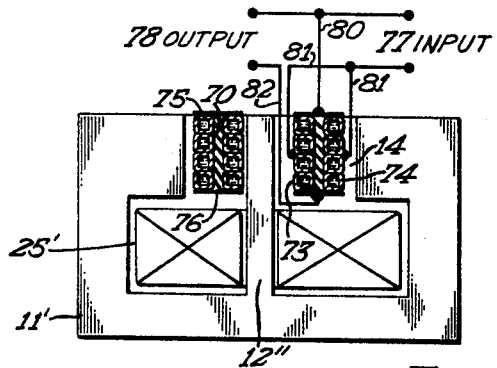
FIGURE 7 is a schematic representation of a device utilizing two concentric helical fluid conduits that are electrically connected for direct current to direct current conversion.

In FIGURE 7, there is disclosed a device which is utilized for converting direct current to direct current of a different level. In this device, a single coil 25' is utilized in a laminated or solid magnetic structure 11' and 12". This structure also could incorporate the permanent magnet 12' of FIGURE 4 as the center leg. Again an air gap 14 is provided across which a magnetic flux passes. Incorporated in the air gap 14 is a pair of concentric spiral gaps 73 and 74 which are joined electrically across their tops at 75 and across their bottoms at 76. These spiral conduits are separated by insulator 70 into two concentric spiral conduits through which the conductive fluid can flow. By joining the conduits 73 and 74 together at their top 75 and bottom 76 by electrical conductive devices, two parallel current paths are provided. The input to this device is disclosed at 77, while the output is disclosed at 78. The input 77 is from any direct current source to be converted and allows the current to flow on conductor 80 to the top 75 of the conduits 73 and 74. The current splits and flows equally down to an intermediate point where it is collected on conductor 81 to return to the input source. With this arrangement, part of the spiral conduits 73 and 74 are utilized to create the movement of the enclosed conductive fluid. This movement, since it is in a pair of spiral gaps, moves the conductive fluid through the entire gap structure. The movement of the conductive fluid in the air gap 14 causes the generation of an electric potential between the conductor 80 and the bottom 76 of the spiral conduits. The output 78 available between conductor 80 and a conductor 82 is therefore substantially different than the input to the present device. As a result, a transformation ratio exists, dependent on how far along in the spiral the conductors 81 join into the walls of the spiral configuration.

Figure 8:
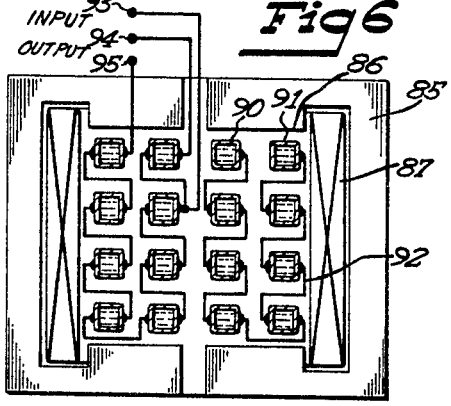
FIGURE 8 is a schematic representation of a modification of the present invention in which the magnetic circuit has its air gap located in a different position.

In FIGURE 8, an entirely different magnetic structure has been shown. The showing is distorted to make the presentation simple. In this particular device, a magnetic circuit 85, having an air gap 86 and energizing coil 87, has been provided. The air gap 86 in this particular case is in the vertical dimension of the magnetic structure 85 and a flux can be provided vertically across the air gap 86. Placed in the air gap 86 is a single, spiral conduit with two concentric portions 90 and 91 that are electrically connected by conductors 92 that interconnect the sides of the turns of the spiral at mutual right angles to the direction of the flux generated in the device. Insulated laminated members (not shown for the sake of clarity) separate the turns of the channel to complete the magnetic structure. This flux flows across the air gap 86 with the conductors 92 connected from one side of the spiral channel to the opposite side of the spiral channel. Again, a complete spiral arrangement has been provided for fluid flow with one spiral 90 within the second spiral 91 and the two interconnected as a series conduit. This provides a rather long fluid flow path that never leaves the magnetic circuit.

The input to the device of FIGURE 8 is supplied between electrodes 93 and 94 which are in turn connected to two points on the inside spiral conduit 90. This provides for a current flow between the electrodes 93 and 94 which passes through the conduit 90 at right angles to the magnetic flux generated by coil 87 across the air gap 86. This forces the fluid to circulate in the continuous spiral fashion and an output potential is derived between the electrode 94 and an electrode 95 that is connected to a point on the conduit 91.

It becomes apparent from the discussion of the FIGURES 4-8 that many variations of the present invention can be accomplished. There are endless configurations of spiral or helical types of conduit configurations that could be placed in the device and which will perform the power conversion function that is disclosed in the simple channel of the device disclosed in FIGURES 1-3.

In order to utilize the power from the conductive fluid power conversion means, it is necessary to separate the alternating and direct current sources from one another. Means for accomplishing this are disclosed in FIGURES 9-11. Only the simplest form will be described for ease and it is understood that the same structure could be used with the various configurations disclosed without departing from the present invention.

In FIGURE 9, a simple bucking arrangement is disclosed. A conductive fluid power conversion means is schematically shown at 10 and has alternating current inputs 23 and 24 disclosed at the top while the conductors 30' and 31' represent a direct current input to the coils 25-28 of FIGURE 1. The output of the power conversion means is on a pair of conductors marked as electrodes 51 and 60. Each of the power conversion means is connected to a source of high current, low voltage direct current marked as 100. Each of these sources 100 could be a fuel cell or similar type device that is capable of generating an exceedingly large current at low potential. A stationary transformer means 101 is disclosed having magnetic core means 102 and a pair of input circuit means 103 and 104. The transformer further has an output circuit means 105. In considering the operation of the device of FIGURE 9, it will be appreciated that the current flow between electrodes 51 and 60 contains both an alternating current component and a direct current component. In transformer means 101, the current flowing in the input circuit means 103 and 104 will generate a pair of equal and opposite constant magnetic fields in the core means 102 so that the core means does not become saturated. The input circuit means 103 and 104 have been selected and polarized so that the flux generated in each of these is opposite to one another, thereby cancelling each other. The only component that passes from the input circuit means 103 and 104 to the output circuit means 105 is the alternating current that is available from the device. The arrangement of FIGURE 9 best discloses a simple means of obtaining the alternating current from the conductive fluid electric power conversion system wherein two power conversion means are used.

In FIGURE 10, a pair of power conversion means 10 are again disclosed with a battery or direct current 100 and the necessary alternating current and direct current connections which are identical to that of FIGURE 9. In this arrangement, the devices are connected to a stationary transformer means 101' that has a tapped input circuit means 103' and 104'. The operation of this device is normally referred to as a push-pull type unit and operates on the principle of alternately causing current to flow in the two input circuit means 103' and 104'. Since the input circuits 103' and 104' are arranged with a center tap, it is possible to have alternate current flow through the two halves of the device, thereby causing a cancellation of any constant magnetic field in core 102 that might be generated and thereby the transformation of only the alternating current available is provided.

Figure 11:
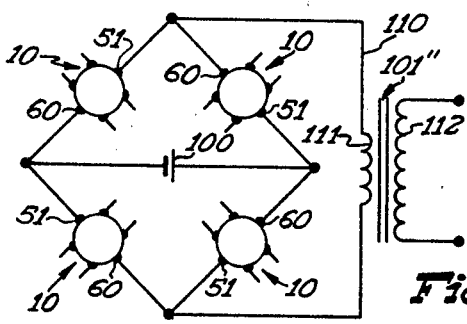

In FIGURE 11, a bridge configuration of units has been disclosed in simplified form. The power conversion means 10 have had their output electrodes designated as 51 and 60. The power conversion means 10 have been hooked in a conventional bridge configuration with a direct current power source 100 to be converted across one leg of the bridge and the transformer means 101", connected across the other leg of the bridge. In this configuration, there is no need to buck out the constant magnetic field that would be generated by the direct current flow, as the bridge arrangement inherently causes the direct current to flow only in the center leg where the battery 100 is located. The alternating current flows in conductor 110 and passes from the input circuit means 111 to the output circuit means 112 thereby providing a usable alternating current as the devices output.

The disclosure of FIGURES 9, 10, and 11 are of three possible arrangements to utilize the power conversion means in a power conversion system thereby eliminating the direct current that normally would flow in the output of the device. These configurations are representative only of three possible ways and others would become apparent to one skilled in the art.

The applicant has disclosed a very basic concept for utilizing electric power that is otherwise of a level that could not be readily utilized. The power conversion means themselves disclosed in FIGURES 1–8 are typical of various configurations that are possible, but in no way are limitations of the many other possible configurations that would be obvious to one skilled in the art. The conversion systems of FIGURES 9–11 also are merely representative of preferred embodiments and are by no means meant to be limitations on the ways of utilizing the output of the power conversion means in systems. The disclosures, having been made of the preferred embodiments, constitute no limitation on the scope of the present invention, and this scope is defined only in the scope of the appended claims.

I claim as my invention:

1. A conductive fluid electric power conversion means, including: magnetic circuit means having an annular air gap; non-rotating magnetic flux generating means associated with said magnetic circuit means to generate a magnetic flux that is stationary in space across said air gap; closed fluid conduit means filled with a conductive fluid and located in said air gap; electrode means connected to said conduit means to conduct an electric current to be converted through said conductive fluid at mutually right angles to said magnetic flux and a fluid flow direction of said fluid conduit means; said current and a first component of said magnetic flux causing said conductive fluid to circulate through said conduit means in an endless fashion; and said moving fluid and a second component of said magnetic flux generating an electric current output between said electrode means to provide an electric current different from that of said electric current to be converted.

2. A conductive fluid electric power conversion means, including: magnetic circuit means having an annular air gap; non-rotating magnetic flux generating means including electric coil means associated with said magnetic circuit means to generate a magnetic flux that is stationary in space across said air gap; closed fluid conduit means filled with a conductive fluid and located in said air gap; electrode means connected to said conduit means to conduct an electric current to be converted through said conductive fluid at mutually right angles to said generated magnetic flux and a fluid flow direction of said fluid conduit means; said current and a first component of said magnetic flux causing said conductive fluid to circulate through said conduit means in an endless fashion; and said moving fluid and a second component of said magnetic flux generating an electric current output between said electrode means to provide an electric current different from that of said electric current to be converted.

3. A conductive fluid electric power conversion means including: magnetic circuit means having an annular air gap; magnetic flux generating means including a pair of electric coil means associated with said magnetic circuit means to generate a magnetic flux radially across said air gap; a first of said coil means connected to a direct current source and a second of said coil means connected to an alternating current source to thereby generate said magnetic flux; closed fluid conduit means filled with a conductive fluid and located in said air gap; electrode means connected to said conduit means to conduct a direct current to be converted through said conductive fluid at mutually right angles to said magnetic flux generated by said first coil means and a fluid flow direction of said fluid conduit means; said direct current and said magnetic flux generated by said first coil means causing said conductive fluid to circulate through said conduit means in an endless fashion; and said moving fluid and said magnetic flux generated by said second coil means generating an alternating current output between said electrode means to provide an electric current different in form from that of said direct current to be converted.

4. A conductive fluid electric power conversion means, including: magnetic circuit means including a permanent magnet portion and said circuit means having an annular air gap; magnetic flux generating means including electric coil means associated with said permanent magnet in said magnetic circuit means to generate a magnetic flux across said air gap; closed fluid conduit means filled with a conductive fluid and located in said air gap; electrode means connected to said conduit means to conduct an electric current to be converted through said conductive fluid at mutually right angles to said permanent magnet magnetic flux and a fluid flow direction of said fluid conduit means; said current and a first component of said magnetic flux including said permanent magnet flux causing said conductive fluid to circulate through said conduit means in an endless fashion; and said moving fluid and a second component of said magnetic flux generating an electric current output between said electrode means to provide an electric current different from that of said electric current to be converted.

5. A conductive fluid electric power conversion means, including: laminated magnetic circuit means having an annular air gap; electric coil means associated with said magnetic circuit means to generate magnetic flux across said air gap; closed fluid conduit means filled with a conductive fluid and located in said air gap; electrode means connected to opposite sides of said conduit means to conduct a direct current to be converted through said conductive fluid at mutually right angles to said generated magnetic flux and the circumference of said fluid conduit; said direct current and a first component of constant flux of said magnetic flux causing said conductive fluid to circulate around said conduit in an endless fashion; and said moving fluid and a second component of said magnetic flux generating an electric current between said electrode means to provide an electric current different from that of said direct current to be converted.

6. A conductive fluid electric power conversion means, including: a laminated magnetic circuit having an annular air gap; magnetic flux generating means including a pair of electric coil means associated with said magnetic circuit to generate a magnetic flux radially across said air gap; a first of said coil means connected to a direct current source and a second of said coil means connected to an alternating current source to thereby generate said magnetic flux; an annular fluid conduit filled with a conductive fluid substantially filling said air gap; a pair of electrodes connected to opposite sides of said conduit to conduct a direct current to be converted through said conductive fluid at mutually right angles to said magnetic flux generated by said first coil means and a circumferential fluid flow direction of said fluid conduit; said direct current and said magnetic flux generated by said first coil means causing said conductive fluid to circulate through said conduit in an endless fashion; and said moving fluid and said magnetic flux generated by said second coil means generating an alternating current output between said pair of electrodes to provide an electric current different in form from that of said direct current to be converted.

7. A conductive fluid electric power conversion means, including: a laminated magnetic circuit having an annular air gap; magnetic flux generating means including a pair of electric coil means associated with said magnetic circuit to generate a magnetic flux radially across said air gap; a first of said coil means connected to a direct current source to be converted and a second of said coil means connected to an alternating current source to thereby generate said magnetic flux; an insulated annular fluid conduit filled with a conductive fluid substantially filling said air gap; a pair of electrodes connected to opposite sides of said conduit to conduct said direct current to be converted through said conductive fluid at mutually right angles to said magnetic flux generated by said first coil means and a circumferential fluid flow direction of said fluid conduit; one of said electrodes passing through said air gap adjacent said conduit to magnetically compensate said magnetic circuit; said direct current and said magnetic flux generated by said first coil means causing said conductive fluid to circulate through said conduit in an endless fashion; and said moving fluid and said magnetic flux generated by said second coil means generating an alternating current output between said pair of electrodes to provide an electric current different in form from that of said direct current to be converted.

8. A conductive fluid electric power conversion means, including: magnetic circuit means having an annular air gap; electric coil means associated with said magnetic circuit means to generate magnetic flux radially across said air gap; a pair of electrically insulated concentric fluid conduits filled with a conductive fluid and located in said air gap; electrical connection means joining said conduits at an inner edge, electrode means connected to outer sides of said conduits to conduct an electric current to be converted through said conductive fluid of both conduits at right angle to said generated magnetic flux and the circumferences of said fluid conduits; said current and a first component of said magnetic flux causing said conductive fluid to circulate around said conduits in an endless fashion; and said moving fluid and a second component of said magnetic flux generating an electric current between said electrode means to provide an electric current different from that of said electric current to be converted.

9. A conductive fluid electric power conversion means, including: magnetic circuit means having an annular air gap; magnetic flux generating means including a pair of electric coil means associated with said magnetic circuit means to generate a magnetic flux radially across said air gap; a first of said coil means connected to a direct current source and a second of said coil means connected to an alternating current source to thereby generate said magnetic flux; closed fluid conduit means filled with a conductive fluid and located in said air gap; said conduit means being helical in form and substantially filling said air gap; electrode means connected to said helical conduit means to conduct a direct current to be converted across the turns of said helix with said conductive fluid at mutually right angles to said magnetic flux generated by said first coil means and a fluid flow direction of said fluid conduit means; said direct current and said magnetic flux generated by said first coil means causing said conductive fluid to circulate through said conduit means in an endless spiral fashion; and said moving fluid and said magnetic flux generated by said second coil means generating an alternating current output between said electrode means to provide an electric current different in form from that of said direct current to be converted.

10. A conductive fluid electric power conversion means, including: magnetic circuit means having an annular air gap; magnetic flux generating means including electric coil means associated with said magnetic circuit means to generate a magnetic flux radially across said air gap; said coil means connected to a direct current source to thereby generate said magnetic flux; closed fluid conduit means filled with a conductive fluid and substantially filling said air gap; said conduit means being helical in form with two concentric helical portions; electrical connection means joining said portions at their inner and outer edges to form two parallel electrical paths; electrode means connected to said conduit means to conduct a direct current to be converted through at least a portion of said conductive fluid at mutually right angles to said magnetic flux generated by said coil means and a fluid flow direction of said helical fluid conduit means; said direct current and said magnetic flux generated by said coil means causing said conductive fluid to circulate through said conduit means in an endless spiral fashion; and said moving fluid and said magnetic flux generated by said coil means generating an electrical output between said electrode means to provide an electric current different in form from that of said direct current to be converted.

References Cited by the Examiner

UNITED STATES PATENTS

| 2,113,393 | 4/1938 | Bierwirth | 330—195 X |
| 2,710,312 | 6/1955 | Hafler et al. | 330—195 X |
| 2,990,485 | 6/1961 | Lee | 310—11 X |
| 3,034,002 | 5/1962 | Carlson | 310—11 |

JOHN F. COUCH, *Primary Examiner.*

LLOYD McCOLLUM, *Examiner.*

W. H. BEHA, *Assistant Examiner.*